US007457703B2

(12) United States Patent
Parker et al.

(10) Patent No.: US 7,457,703 B2
(45) Date of Patent: Nov. 25, 2008

(54) AIRLINE TRAFFIC MODELING AND ALLOCATION SYSTEMS

(75) Inventors: Roger A. Parker, Shoreline, WA (US); Richard Lonsdale, Vancouver (CA)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 11/159,347

(22) Filed: Jun. 23, 2005

(65) Prior Publication Data

US 2006/0293834 A1 Dec. 28, 2006

(51) Int. Cl.
*G06F 17/00* (2006.01)

(52) U.S. Cl. .............................. 701/117; 701/1; 705/10

(58) Field of Classification Search ......... 701/200–202, 701/117–120, 1; 705/5, 7, 10, 13
See application file for complete search history.

(56) References Cited

U.S. PATENT DOCUMENTS 7,209,829 B2 * 4/2007 Litvack et al. .............. 701/202
2003/0158771 A1 * 8/2003 Shen et al. .................... 705/10

* cited by examiner

*Primary Examiner*—Yonel Beaulieu
(74) *Attorney, Agent, or Firm*—Baker Hostetler LLP

(57) ABSTRACT

Devices for redesigning a travel network having a plurality of origin-destination pairs are described. In particular, a surplus determining device is configured to determine the consumer surplus generated by an additional path added to a first origin-destination pair within the travel network using observable utility components of a consumer utility model.

17 Claims, 4 Drawing Sheets

AIRLINE TRAFFIC MODELING AND ALLOCATION SYSTEMS

FIELD OF THE INVENTION

This invention relates to computer-based systems for determining the viability of a change in a travel network.

BACKGROUND OF THE INVENTION

Over the last thirty years, various Airlines and other transportation services have struggled to more efficiently serve their traveling clientele while maintaining profitability. One problem that travel providers often face is the uncertainty when deciding whether to add another alternative flight to serve a particular source and destination. That is, while a travel provider, such as an airline, can generally determine that adding a new flight path to a particular market might better serve the consuming public, it can be highly problematic to determine whether embarking on such an enterprise also would be beneficial to the airline.

In the airline industry, a "market" can refer to a specific pair of terminals representing a travel origin and a travel destination, and "market allocation" can refer to the process of allocating consumer demand for a specific market pair to the various possible routes that serve that market. For example, in the transportation industry, San Jose, Calif. (an origin) and Nashville, Tenn. (a destination) can represent a market pair (or simply "a market"), with a prospective "market allocation" including a distribution of passengers among three separate paths: a flight having a stopover in Chicago, Ill., a flight having a stopover in Minneapolis, Minn. and a flight having a first stopover in both Chicago, Ill. and Baltimore, Md. While the market allocation scenario above appears simple, the reality is that determining whether a direct San Jose to Nashville flight could be profitably added is highly problematic. Further, determining the appropriate price of such an added flight to maximize profits can be even more problematic. Accordingly, new computer-based methods and systems related to market allocation are desirable.

SUMMARY OF THE INVENTION

In one aspect, a computer-based apparatus for redesigning a travel network having a plurality of origin-destination pairs includes a surplus determining device configured to determine the consumer surplus generated by an additional path added to a first origin-destination pair within the travel network.

In a second aspect, a computer-based apparatus for redesigning a travel network having a plurality of origin-destination pairs includes a memory that contains a passenger model, the passenger model having an observable utility component of a consumer utility model, and a means for determining a consumer surplus generated when a first path is added to a first origin-destination pair within the travel network, wherein the means for determining employs the passenger model in its surplus determinations.

In a third aspect, a computer-readable medium containing a plurality of instructions that when accessed by a computer can cause the computer to aid in redesigning a travel network having a plurality of origin-destination pairs is described. The medium includes a first set of instructions configured to determine the consumer surplus generated by an additional path added to a first origin-destination pair within the travel network.

There has thus been outlined, rather broadly, certain embodiments of the invention in order that the detailed description thereof herein may be better understood, and in order that the present contribution to the art may be better appreciated. There are, of course, additional embodiments of the invention that will be described or referred to below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

"Consumer's surplus," or "consumer samples," is an econometric term which describes the amount of money available to a consumer for other uses if he maximizes the utility of his choices. It allows the encapsulation of the wide array of attributes present in a choice situation into a single index of quality, so that, for example, two different airline networks can be validly compared from the perspective of the passenger.

Two general views of consumer surplus have emerged in the economic literature. The first is called "Marshallian", after the renowned $19^{th}/20^{th}$ century economist Alfred Marshall, the second is known as "Hicksian" consumer surplus, named after the English Nobel Prize winning economist Sir John Hicks.

Figure 3:
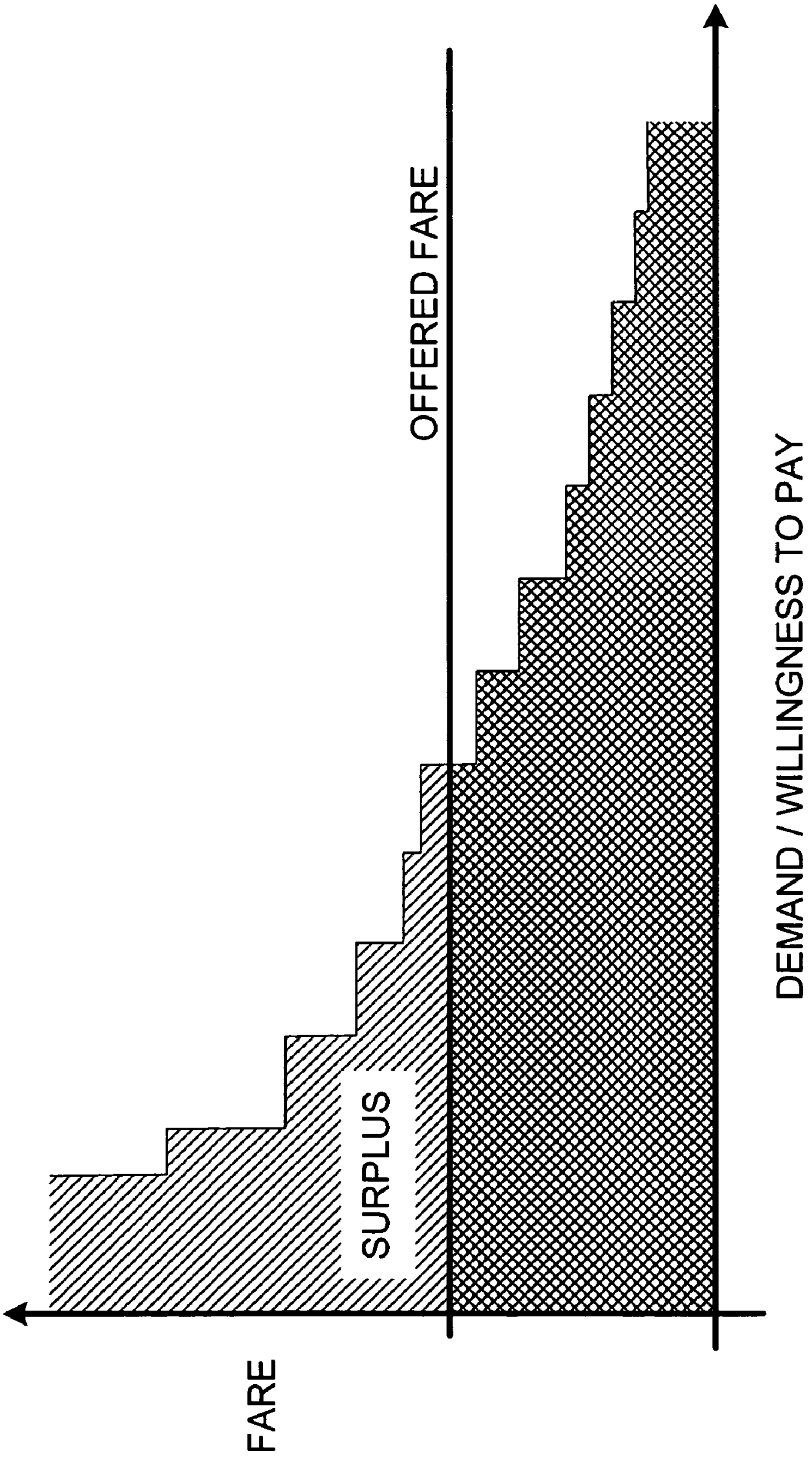
FIG. 3 is a graph that illustrates consumer surplus for a particular flight.

FIG. 3 is a graph that illustrates the Marshallian consumer surplus for a particular flight. The relationship shown in FIG. 3 is also known as a demand or willingness-to-pay (WTP) curve. As is illustrated in FIG. 3, the number of individuals willing to pay a fare amount (vertical axis) generally increases as the price drops. Further, if a particular fare is offered, many will not be able to afford the flight (those to the right and below the fare line) while others can easily afford to pay more.

For those prospective travelers who can pay more, the difference between what the offered price is and what they are willing to pay is the "consumer's surplus". The sum of the consumer's surplus values for each passenger that has one is the total surplus at the offered price, illustrated with the upper left area above the fare line. This form of consumer surplus can also referred to as "compensatory evaluation", since it can be interpreted as how much money a passenger would have to pay under the new set of alternatives to return his utility back to where it was before the new choice was made available.

Figure 1:
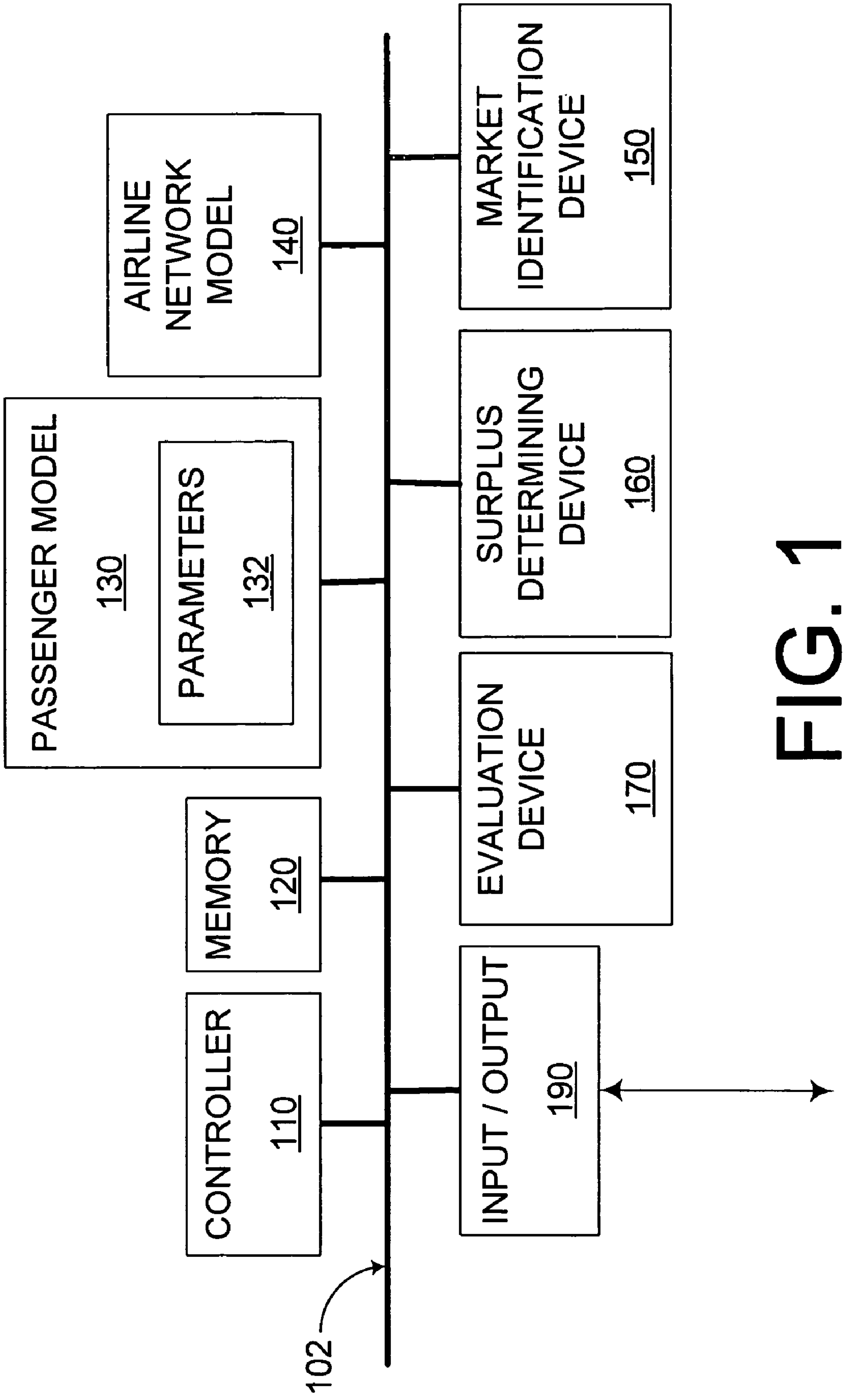
FIG. 1 is a diagram of a device capable of determining the viability of a change in a travel network.
Figure 4:
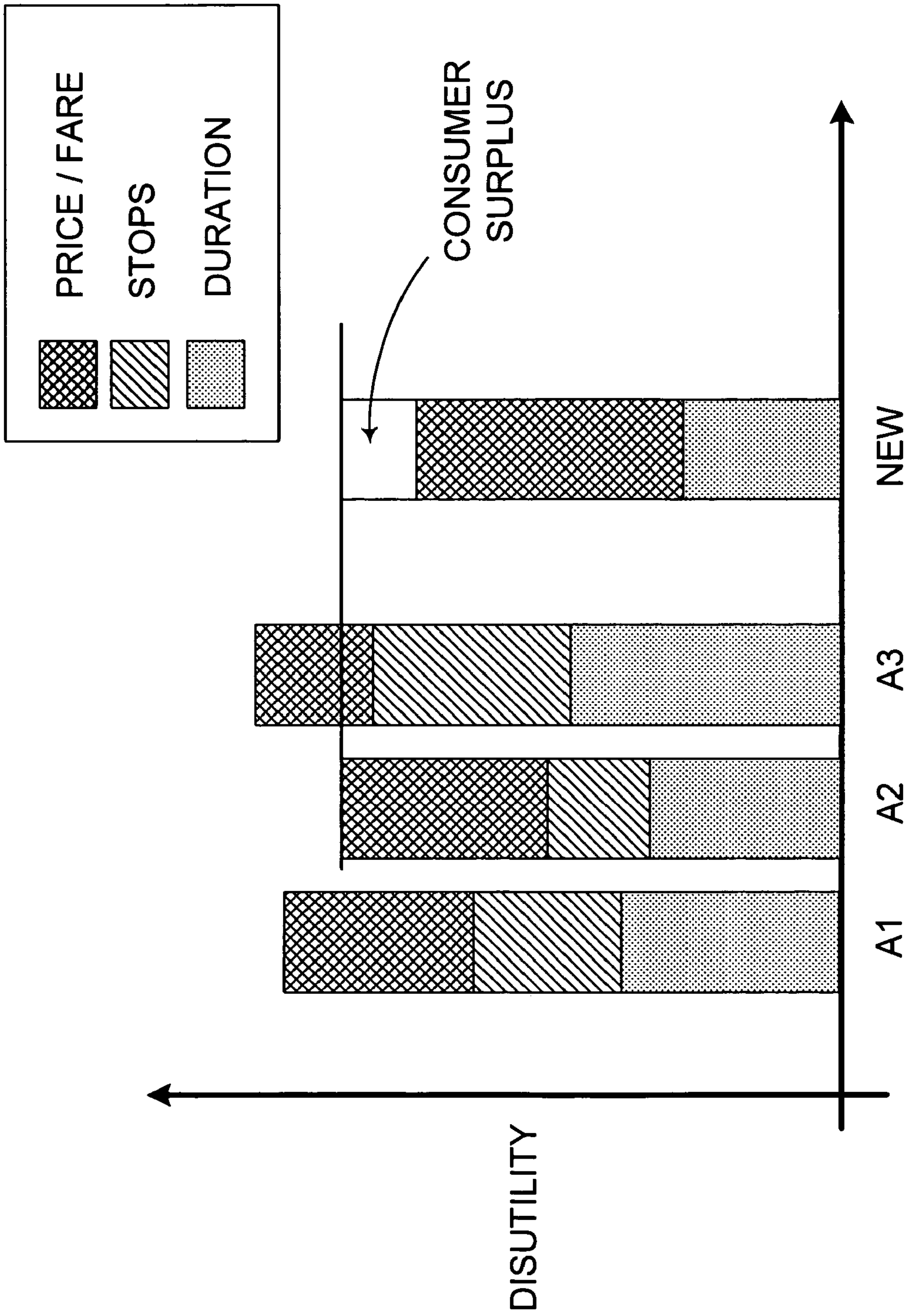
FIG. 4 is a second graph that illustrates consumer surplus for a particular flight.

In contrast with the Marshallian model of FIG. 1, which is based on price, the Hicksian consumer surplus views consumer surplus as a function of utility with price being but one aspect of that utility. An example of Hicksian consumer surplus is illustrated in FIG. 4. Here, the frame of reference is for a single passenger being offered three flights A1, A2 and A3. Each has a disutility (a negative utility) associated with price (fare), duration, and the number of stops. The passenger is expected to choose the alternative with the least disutility (as he views it). Now suppose a NEW alternative is offered (in this case a non-stop alternative). While the NEW option may have a higher fare, the absence of stops gives the NEW option a lower disutility than any of the three pre-existing choices A1, A2 and A3. The difference in the utility between the best situation before the new choice appeared and the best alternative under the new set of choices is the Hicksian consumer's surplus.

With the above explanations in mind, a "Network Value Index", or NVI, is a per passenger change in consumer's surplus brought about by changes in a travel network, such as a network provided by the airline industry. In the case where passenger utility is defined in terms of a logit random utility model, the computation of the Hicksian consumer surplus can be straightforward.

FIG. 1 represents a network evaluator 100 capable of determining the viability of a change in a travel market. As shown in FIG. 1, the network evaluator 100 includes a controller 110, a memory 120, a passenger modeling device 130 having a set of passenger parameters 132, an airline network modeling device 140, a market identification device 150, a surplus determining device 160, and evaluation device 170 and an input/output device 190. The above components 110-190 are coupled together by control/data bus 102.

Figure 2:
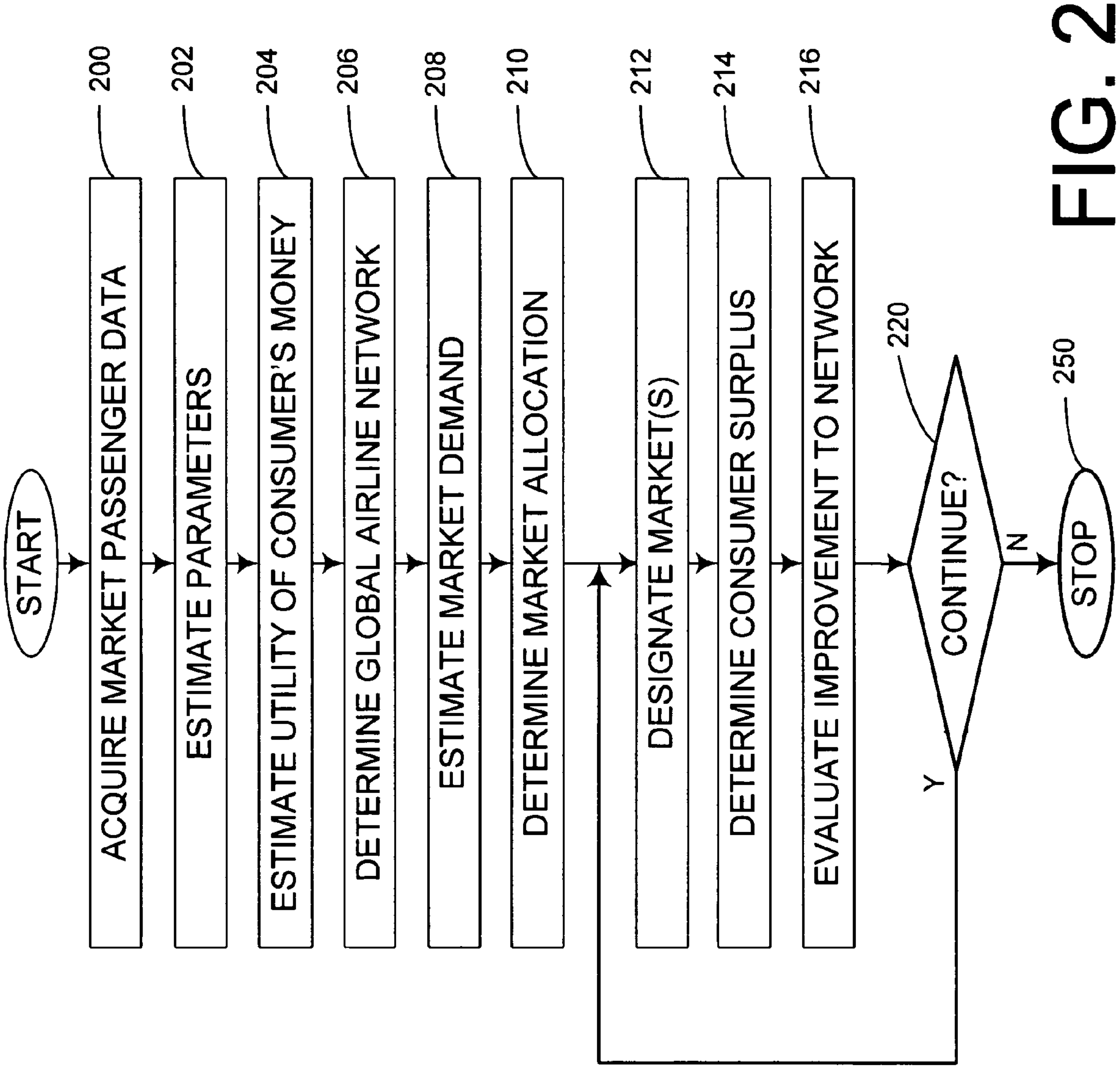
FIG. 2 is a flowchart outlining an exemplary operation for determining the viability of a change in a travel network.

Although the exemplary provider 130 of FIG. 2 uses a bussed architecture, it should be appreciated that any other architecture may be used as is well known to those of ordinary skill in the art. For example, in various embodiments, the various components 110-190 can take the form of separate electronic components coupled together via a series of separate busses.

It also should be appreciated that some of the above-listed components can take the form of software/firmware routines residing in memory 120 and be capable of being executed by the controller 110, or even software/firmware routines residing in separate memories in separate servers/computers being executed by different controllers. Further, it should be understood that the functions of any or all of components 130-170 can be accomplished using object-oriented software, thus increasing portability, software stability and a host of other advantages not available with non-object-oriented software.

Still further, it should be understood that the functions of any or all of components 130-170 can be accomplished using separate processing systems networked together and that either or both of components 140-150 can include multiple processors working in series and/or parallel.

Still further, in other embodiments, one or more of the various components 110-190 can take form of separate servers coupled together via one or more networks. Additionally, it should be appreciated that each of components 110-190 advantageously can be realized using multiple computing devices employed in a cooperative fashion. For example, by employing two or more separate computing devices, e.g., servers, to identify potential markets for each computing device used to make surplus calculations, a processing bottleneck can be reduced/eliminated and the overall computing time to evaluate market changes can be drastically reduced.

In operation, the network evaluator 100 can first develop or import the passenger model 130 and airline network model 140. In developing the passenger model 130, it can be useful to start with an assumption that each passenger as a rule will select a flight representing the maximization of the utility of the flight as viewed by that particular passenger. For a set of flight alternatives indexed by the set J and using subscript n to indicate the passenger, each passenger b can be viewed as having an (internal) function $U_n(i)$ which associates with each flight j a real number, called it's utility. The passenger/decision-maker is assumed to select the alternative (flight i) that has the highest utility according to EQ. (1)

$$i=\max_{j\in J}[U_n(j)]. \tag{1}$$

While only passenger n might know the structure of $U_n(i)$, it can be possible to objectively qualify part of the utility function while assuming the probability distribution of the remaining, unobservable part. Equation (2) below is a simple form mathematical form of this idea:

$$U_n(i)=V_n(i)+\epsilon_n(i) \tag{2}$$

where $U_n(i)$ is the utility function for flight i and passenger n, $V_n(i)$ is the observable portion of the utility function and $\epsilon_n(i)$ is called the random error, or stochastic, portion. If the random/stochastic terms $\epsilon_n(i)$ satisfy these conditions: (1) they are mutually independent for all passengers and are independent of the $V_n$ terms, (2) they have identical probability distributions for all passengers, and (3) they have the Extreme Value Type 1 distribution, then the resulting probability has a logit distribution, given by the EQ. (3) below:

$$P_n(i) = Pr[n\text{'s choice is } i] = \frac{e^{V_n(i)}}{\sum_{j\in J} e^{V_n(j)}}. \tag{3}$$

The inventors of the disclosed methods and systems have worked to develop a variety of accurate logit passenger choice models, including a "high resolution" model and a "low resolution" model. These models differ by the availability of demographic and socioeconomic data. For example, while a low-resolution model might be limited to issues of fare, time, duration and number of stops, a high resolution model can incorporate more personal aspects, such as a passenger's income, sex, race and age. While either model can be used for the NVI calculation, the low resolution model is used for the examples below for the sake of simplicity of explanation.

In all of these utility models, V represents a utility model having a linear vector of parameters. That is, there is a set of K observable variables $x_k$, k =1 to K, and V is a linear combination/array of these variables and estimated parameters. Thus, for a vector $x_n$ of variables and β of parameters, V can take the form of EQ. (4) below:

$$V_n(i) = \sum_{k=1}^{K} \beta_k x_{n,k}(i) = \beta^T x_n. \tag{4}$$

Referring again to FIG. 1, the parameters 132 of the passenger model 130 can be assigned according to any model discussed above, as well as any other similar related model. Further information about passenger choice models can be found in U.S. patent application Ser. No. 10/974,697 entitled "MARKET ALLOCATION DESIGN METHODS AND SYSTEMS" to Roger A. Parker, Richard Lonsdale and Zhengjie Zhang filed on Oct. 28, 2004, the disclosure of which is hereby incorporated by reference in its entirety.

As with the passenger model 130, it should be appreciated that the exemplary network evaluator 100 may need to populate the airline network model 140 by generating a list of all origin-destination market pairs of interest 130 (or alternatively import one via input/out device 190). In various embodiments, it should be appreciated that such a database can be associated with airline hubs, bus depots, train stations or any other end-points or way-stations associated with a particular form or travel. However, it should also be appreciated that the methods and systems of the scheduler can also be applied to travel networks using multiple forms of travel, e.g., airlines and trains.

Once the network evaluator 100 has established the airline network model 140, the network evaluator 100 can use its market identification device 150 in order to identify a list of potential added routes/times for each market pair in a travel network. Details of a particularly useful approach to identifying new markets can be found in U.S. patent application Ser. No. 10/974,697 entitled "MARKET ALLOCATION DESIGN METHODS AND SYSTEMS" mentioned above. However, the particular approach to identifying markets ripe for change can vary among embodiments as may be found advantageous or necessary.

Once market identification device 150 has provided a variety of potential new flights for a particular origin-destination pair, the surplus determining device 160 can determine the consumer surplus, if any, provided by the new flight. Referring again to FIGS. 3 & 4, the consumer surplus can be viewed as the change, in monetary terms, that individual n expects to realize from changes in the available choices. For a change from choice set $J^0$ to choice set $J^1$, this can be expressed by EQ. (5) below:

$$C_n(J^1, J^0) = \frac{1}{\alpha_n}\left\{E\left[\max_{j\in J^1} U_n^1(j)\right] - E\left[\max_{j\in J^0} U_n^0(j)\right]\right\}, \tag{5}$$

where $\alpha_n$ is the marginal utility of money to decision-maker n, and E[·] is mathematical expectation.

If utility is expressed with a logit model with a linear-in-the-parameters form of V, then expectation can be expressed by EQ. (6) below:

$$E\left[\max_{j\in J} U_n(j)\right] = \ln\sum_{j\in J} e^{V_n(j)} \tag{6}$$

and then EQ. (6), in turn, can be expressed as EQ. (7) below:

$$C_n(J^1, J^0) = \frac{1}{\alpha_n}\left\{\ln\left[\sum_{j=1}^{J^1} e^{V_n^1(j)}\right] - \ln\left[\sum_{j=1}^{J^0} e^{V_n^0(j)}\right]\right\}. \tag{7}$$

Notice that the expression in the square brackets is exactly the denominator of the logit form from EQ. (3). Some in the relevant art refer to this as the "inclusive" value while others use the phrase "log sum" value.

Referring to the quantity in the curly brackets in EQ. (7), the difference in the log sums between the new network $J^1$ and the old network $J^0$ is the Network Value Index, which reflects the per passenger change in utility due to the change in the characteristics of the network. Using the notation $N_n(J^1, J^0)$ to indicate the NVI for the pair of networks with respect to passenger n, the incorporation of the $1/\alpha_n$ term has the effect of converting that utility to money.

It should be appreciated that the comparison of the two networks can be differentiated according to any attributes of the network that are captured by the utility function V. For example, with reference to FIG. 2, (which uses a low-resolution choice model), attributes include fare, departure and arrival times, duration, and number of stops. Thus, one can examine the NVI that is created when a non-stop is added to a market where none now exists. As another example, one can assess the overall quality of a network when compared to, say, an appropriate base network. A third example would be the computation of the fare premium available as a result of a network configuration improvement.

Given that the NVI is an index of the change in value of modifications to a market's path set, and dividing by $\alpha_n$ can convert the NVI to an expected dollar value of the changes to that passenger, i.e., that passenger's consumer surplus. So, if $Q_m$ is the set of passengers in market m, the total expected generated consumers' surplus $C_m$ can be expressed by EQ. (8) below:

$$C_m(J^1, J^0) = \sum_{n\in Q_m} \frac{N_n(J^0, J^1)}{\alpha_n}. \tag{8}$$

With the low resolution passenger choice model, one can assume that the $V_n(i)$ terms of $N_n$ contain no personal passenger characteristics (e.g., age and income), and so one can consider all the passengers the same in such respects. This means that, for all n, $N_n$ can be assumed a constant N, and $\alpha_n$ can be assumed a constant α. Then, if $D_m$ is the number of passengers in set of passengers $Q_m$, The surplus determining device 160 can use EQ. (9) below to represent the total consumers' surplus for travelers in market m.

$$C_m(J^1, J^0) = \frac{D_m}{\alpha} N(J^0, J^1). \tag{9}$$

While EQ. (9) provides a useful basis for determining consumer surplus for a single market m, it should be appreciated that it can be desirable for the surplus determining device 160 to determine consumer surplus for a collection of markets. To move conceptually from a single market to a collection of markets, a weighted average can be used in order to adopt an approach having a straightforward calculation. Suppose M is a set of markets, let $D_m$ be the number of passengers in market m, and then define the number of passengers in the set of markets $D_T$ as:

$$D_T = \sum_{m \in M} D_m \tag{10}$$

From EQ. (10), we can define the aggregate NVI according to EQ. (11) below:

$$N(M, J^0, J^1) = \sum_{m \in M} D_m^* N_m(J^0, J^1). \tag{11}$$

where $$D_m^* = \frac{D_m}{D_T}. \tag{12}$$

The surplus determining device 160 can determine aggregate consumer surplus for the collection of markets according to EQ. (13) below as a weighted average of the NVI's for the individual markets in M:

$$C_M(J^0, J^1) = \frac{D_T}{\alpha} N(M, J^0, J^1), \tag{13}$$

While EQs. (9) and (13) provide a useful basis for determining consumer surplus, it might be appreciated that a single model for every passenger might be limiting in certain circumstances. That is, as useful as a low-resolution utility model might be, a high-resolution model might be preferable in certain cases as in real life there will likely be a distribution of a population's socioeconomic characteristics, such as age and income. Suppose the vector of variables in the observable utility component V contains a sub-vector of population characteristics, y. Then the aggregation of the NVI's for a passenger population can take the form of EQ. (14) below:

$$\begin{aligned} C_m(J^1, J^0) &= \sum_{n \in Q_m} \frac{N_n(J^0, J^1)}{\alpha_n} \\ &= \int_{\pi \in \Pi} \frac{1}{\alpha(\pi)} N_\pi(J^0, J^1) d\Phi(y) \end{aligned} \tag{14}$$

where Φ is the distribution of characteristics y in population II.

In order to better understand the function of the consumer surplus determining device 160, consider the following example where a non-stop flight is introduced into a given market having three flights/paths presently serving passengers. Suppose the function V can be defined as:

$$\begin{aligned} V_n(i) &= \sum_{k=1}^{2} \beta_k x_{n,k}(i) \\ &= -0.0027 f_i - 1.687 \ln d_b d_i - 1.334 S_i + 0.333 X_{am,i} \end{aligned}$$

where $\beta_k$ is an empirically determine model parameter/coefficient for characteristic $x_{n,k}$, i.e., fare f, duration d and number of stops S, and where X=1 if a morning departure, 0 otherwise. By replacing the logarithmic function of a fare In(fare) with a linear approximation, Table 1 below might be derived for the original market with three paths.

TABLE 1

Example Market with Three Paths

| Fare | Duration | Stops | AM Depart | V | Exp(V) |
|---|---|---|---|---|---|
| $200 | 7 hours | 2 | No | −10.898 | 0.00001849 |
| $400 | 5 hours | 1 | Yes | −7.574 | 0.00051363 |
| $400 | 4.5 hours | 1 | No | −7.357 | 0.00063766 |
| | | | Log Sum | | −6.75093216 |

Notice that in Table 1 the four attributes (fare, duration, stops and departure time) are specified, V is calculated, and exp(V) is subsequently derived. The resulting log sum as calculated from EQ. (6) is then provided in the bottom-right corner.

Continuing to Table 2, which assumes a fourth, non-stop flight is added, the process is repeated. Note that the non-stop flight of this example has a shorter duration than the other flights and departs in the morning. As a result, the resulting log sum is greater than that for the original case of Table 1.

TABLE 2

Same Market with a Fourth Flight

| Fare | Duration | Stops | AM Depart | V | Exp(V) |
|---|---|---|---|---|---|
| $200 | 7 hours | 2 | No | −10.898 | 0.00001849 |
| $400 | 5 hours | 1 | Yes | −7.574 | 0.00051363 |
| $400 | 4.5 hours | 1 | No | −7.357 | 0.00063766 |
| $400 | 4 hours | 0 | Yes | −5.141 | 0.00584949 |
| | | | Log Sum | | −4.95909415 |

The NVI is then calculated as:

$$N(J^1, J^0) = -4.95909415 + 6.75093216 = 1.79183741$$

For an α=0.0027, $C(J^0,J^1)$ will be $663.64 per passenger. If the number of passengers in the market is, say, 100, the total consumers' surplus created by passengers in this market due to the addition of the nonstop is $C_m(J^0, J^1)$=$66,364.

Again returning to FIG. 1, once the surplus determining device 160 has determined a consumer surplus for a given market change, the evaluation device 170 provides the next step, i.e., determining the cost of providing a proposed new flight, which in turn can establish the potential profitability of such service improvements. For the example of Tables 1 & 2, suppose that the cost of the proposed added flight using a particular jet J1 would be $100,000. Given the surplus exceed the costs, the evaluation device 170 would determine that the added flight was economically unfeasible/unprofitable.

However, consider the introduction of a new type of aircraft J2. If the cost of the proposed added flight using jet J2 would be $40,000, then the evaluation device 170 would determine that the added flight was economically feasible. However, if other consideration are taken into account, such as a limit of three new planes, the evaluation device 170 might need to determine the three most profitable additions, not just every feasible addition.

FIG. 2 is a flowchart outlining an exemplary operation for determining the viability of a change in a travel network. The process starts in step 200 where passenger data, such as data associated with consumer preferences, is acquired. While such data can often be acquired through observation and surveys, the particular form of data acquisition can vary as required from embodiment to embodiment. Next, in step 202, market parameters qualifying consumer preferences are determined using the acquired data of step 200. Then, in step, 204, the utility of consumer money is estimated using the acquired data of step 200 to form a utility model. Control continues to step 206.

In step 206, a global travel network, such as that for an airline, is determined. Generally, such information is readily availably from public sources and the method of acquisition is not particularly important. Next, in step 208 and 210, market demand is estimated and market allocation determined (i.e., prospective markets subject to the possible addition of a new flights are identified). As discussed above, details to an exemplary set of relevant processes for steps 208-210 can be found in U.S. patent application Ser. No. 10/974,697 entitled "MARKET ALLOCATION DESIGN METHODS AND SYSTEMS" mentioned above. However, the exact processes behind steps 208-210 can vary as required or otherwise found desirable. Control continues to step 212.

In step 212, one or more first market additions of those markets identified for improvement in step 210 are designated for analysis. Then, in step 214, the consumer surplus is determined for the designated market(s). As discussed above, this process can involve determining the utility of the relevant market before and after the added flight according to EQ. (6), then determining the difference according to EQ. (7). However, for aggregate markets these processes may need to be modified as suggested with respect to EQs. (10)-(13) and their associated text. Further, in order to account for variations in consumer demographics, the consumer surplus model of EQ. (14) also may be alternatively used or adapted. Control continues to step 216.

In step 216, the market improvement, if any, to the travel network is evaluated for viability, e.g., whether the potential profit (consumer surplus) sufficiently exceeds the costs of fulfilling the market improvement. Obviously, if the market improvement is negative, or the costs outweigh the improvements, a positive evaluation is not likely. Control continues to step 220.

In step 220, a determination is made as to whether to continue evaluating more markets for additional flights. If more evaluations are to be made, control jumps back to step 212; otherwise, control continues to step 250 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements ofthe above-described systems and/or methods, implement the individual systems and/or methods and coordinate the functions of the various disclosed systems and/or methods The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-based apparatus for redesigning a travel network having a plurality of origin-destination pairs, comprising:

a surplus determining device configured to determine the consumer surplus generated by an additional path added to a first origin-destination pair within the travel network;

wherein the surplus determining device performs an expectation calculation on the first origin-destination pair before a proposed added path, and further performs an expectation calculation on the first origin-destination pair taking into account the proposed added path; and wherein the surplus determining device performs a surplus determination $C_n(J^1, J^0)$ based on the following equation:

$$C_n(J^1, J^0) = \frac{1}{\alpha_n}\left\{\ln\left[\sum_{j=1}^{J^1} e^{V_n^1(j)}\right] - \ln\left[\sum_{j=1}^{J^0} e^{V_n^0(j)}\right]\right\},$$

where $V^0$ is an observable utility component of a consumer utility model in an existing travel network ($J^0$), $V^1$ is an observable utility component of a consumer utility model in a modified travel network ($J^1$), $\alpha_n$ is the marginal utility of money to decision-maker n, $J^0$ denotes an existing travel network and $J^1$ denotes a respective modified network of $J^0$.

2. The apparatus of claim 1, wherein the surplus determining device uses a consumer utility function having a set of low-resolution parameters.

3. The apparatus of claim 2, wherein the surplus determining device uses a consumer utility function having a set of high-resolution parameters.

4. The apparatus of claim 2, wherein the set of parameter relate to at least one of fare, number of stops and travel duration.

5. The apparatus of claim 4, wherein the set of parameters relate to all of fare, number of stops and travel duration.

6. The apparatus of claim 1, wherein the surplus determining device performs an aggregate surplus determination.

7. The apparatus of claim 6, wherein the surplus determining device performs an aggregate surplus determination $C_M(J^0, J^1)$ based on the following equation:

$$C_M(J^0, J^1) = \frac{D_T}{\alpha} N(M, J^0, J^1),$$

where M is a set of markets, $D_T$ is the number of passengers in the set of markets M, $\alpha$ is the marginal utility of money to a decision-maker, $J^0$ denotes an existing travel network and $J^1$ denotes a respective modified network of $J^0$.

8. The apparatus of claim 1, wherein the surplus determining device performs a surplus determination taking into account a population's socioeconomic characteristics, such socioeconomic characteristics including age and income.

9. The apparatus of claim 8, wherein the surplus determining device performs a surplus determination according to the equation:

$$C_m(J^1, J^0) = \sum_{n \in Q_m} \frac{N_n(J^0, J^1)}{\alpha_n} = \int_{\pi \in \Pi} \frac{1}{\alpha(\pi)} N_\pi(J^0, J^1) d\Phi(y)$$

where y is a sub-vector of population characteristics, $\alpha_n$ is the marginal utility of money to decision-maker n, $J^0$ denotes an existing travel network, $J^1$ denotes a respective modified network of $J^0$, and $\Phi$ is a distribution of characteristics y in a population $\pi$.

10. The apparatus of claim 1, further comprising an evaluating device that determines whether a modified origin-destination market pair is viable based on the determined surplus and a cost associated with adding the proposed path.

11. The apparatus of claim 1, further comprising an airline network model and a passenger utility model, wherein the surplus determining device is configured to determine the consumer surplus using both the airline network model and the passenger utility model.

12. The apparatus of claim 11, wherein the surplus determining device is configured to determine the consumer surplus using both the airline network model, and the passenger model includes an low-resolution observable utility component V of a consumer utility model.

13. A computer-readable medium containing a plurality of instructions that when accessed by a computer can cause the computer to aid in redesigning a travel network having a plurality of origin-destination pairs, the medium comprising:

a first set of instructions configured to determine the consumer surplus generated by an additional path added to a first origin-destination pair within the travel network; and wherein the first set of instructions performs a surplus determination $C_n(J^1, J^0)$ based on the following equation:

$$C_n(J^1, J^0) = \frac{1}{\alpha_n}\left\{\ln\left[\sum_{j=1}^{J^1} e^{V_n^1(j)}\right] - \ln\left[\sum_{j=1}^{J^0} e^{V_n^0(j)}\right]\right\},$$

where $J^0$ denotes an existing travel network and $J^1$ denotes a respective modified network of $J^{0,}$ $V^0$is an observable utility component of a consumer utility model in the existing travel network $J^0$, $V^1$is an observable utility component of a consumer utility model in the modified travel network $J^1$, $\alpha_n$ is the marginal utility of money to decision-maker n.

14. The computer-readable medium of claim 13, further comprising a memory that contains a passenger utility model, the passenger utility model having an observable utility component V of a consumer utility model, wherein the first set of instructions employs the passenger utility model in its surplus determinations.

15. The computer-readable medium of claim 13, further comprising a memory that contains the passenger utility model.

16. A computer-based apparatus for redesigning a travel network having a plurality of origin-destination pairs, comprising:

a surplus determining device configured to determine the consumer surplus generated by an additional path added to a first origin-destination pair within the travel network;

wherein the surplus determining device performs an aggregate surplus determination; and wherein the surplus determining device performs an aggregate surplus determination $C_M(J^0, J^1)$ based on the following equation:

$$C_M(J^0, J^1) = \frac{D_T}{\alpha} N(M, J^0, J^1)$$

where M is a set of markets, $D_T$ is the number of passengers in the set of markets M, $\alpha$ is the marginal utility of money to a decision-maker, $J^0$ denotes an existing travel network and $J^1$ denotes a respective modified network of $J^0$.

17. A computer-based apparatus for redesigning a travel network having a plurality of origin-destination pairs, comprising:

a surplus determining device configured to determine the consumer surplus generated by an additional path added to a first origin-destination pair within the travel network, wherein the surplus determining device performs a surplus determination taking into account a population's socioeconomic characteristics, such socioeconomic characteristics including age and income; and wherein the surplus determination is performed according to the equation:

$$C_m(J^1, J^0) = \sum_{n \in Q_m} \frac{N_n(J^0, J^1)}{\alpha_n} = \int_{\pi \in \Pi} \frac{1}{\alpha(\pi)} N_\pi(J^0, J^1) d\,\Phi(y)$$

where y is a sub-vector of population characteristics, $\alpha_n$ is the marginal utility of money to decision-maker n, $J^0$ denotes an existing travel network, $J^1$ denotes a respective modified network of $J^0$, and $\Phi$ is a distribution of characteristics y in a population $\pi$.

* * * * *